United States Patent
Nilsson et al.

(10) Patent No.: US 12,208,721 B2
(45) Date of Patent: Jan. 28, 2025

(54) CARGO DIVIDER FOR ARRANGEMENT BETWEEN A FIRST VEHICLE SEAT BACKREST AND AN ADJACENT SECOND VEHICLE SEAT BACKREST AND A VEHICLE SEAT

(71) Applicants: Ningbo Geely Automobile Research & Development Co., Ltd., Ningbo (CN); Zhejiang Geely Holding Group Co., Ltd., Zhejiang (CN)

(72) Inventors: Magnus Nilsson, Floda (SE); Jonathan Johansson, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 291 days.

(21) Appl. No.: 17/839,039

(22) Filed: Jun. 13, 2022

(65) Prior Publication Data
US 2022/0297584 A1 Sep. 22, 2022

Related U.S. Application Data

(63) Continuation of application No. PCT/CN2020/132044, filed on Nov. 27, 2020.

(30) Foreign Application Priority Data
Dec. 19, 2019 (EP) .................................... 19218249

(51) Int. Cl.
*B60N 2/90* (2018.01)
*B60N 2/20* (2006.01)
(Continued)

(52) U.S. Cl.
CPC ............... *B60N 2/91* (2018.02); *B60N 2/206* (2013.01); *B60R 21/06* (2013.01)

(58) Field of Classification Search
CPC .. B60N 2/91; B60N 2/206; B60N 2/36; B60R 21/026; B60R 21/06
See application file for complete search history.

(56) References Cited

U.S. PATENT DOCUMENTS

2002/0067047 A1* 6/2002 Seel .................... B60R 21/06
296/24.43
2008/0048424 A1 2/2008 Hakansson
(Continued)

FOREIGN PATENT DOCUMENTS

| CN | 109131149 A | 1/2019 | |
| DE | 10107265 A1 * | 8/2002 | ............. B60R 21/06 |

(Continued)

OTHER PUBLICATIONS

International Search Report from corresponding International Application No. PCT/CN2020/132044, mailed on Feb. 25, 2021, 3 pages.
(Continued)

*Primary Examiner* — Daniel J Colilla
(74) *Attorney, Agent, or Firm* — Tucker Ellis LLP

(57) ABSTRACT

A cargo divider between a first vehicle seat backrest and a second vehicle seat backrest used when one of the first or second backrest is folded down. The divider includes a first structure part along a lateral edge of the first backrest adjacent the second backrest, including a first top section, a first middle section and a first bottom section; a second structure part arranged along a lateral edge of the second backrest adjacent the first backrest, including a second top section, a second middle section and a second bottom section; a first wire having a first end attached to the first top section and a second end attached to the second top section; one or a plurality of further wires including a first end
(Continued)

attached along the first middle section and a second end attached correspondingly along the second middle section.

14 Claims, 2 Drawing Sheets

(51) Int. Cl.
    *B60N 2/36*     (2006.01)
    *B60R 21/06*     (2006.01)

(56) References Cited

U.S. PATENT DOCUMENTS

| | | | | |
|---|---|---|---|---|
| 2009/0058154 | A1* | 3/2009 | Stojanovic | B60N 2/3038 297/217.1 |
| 2017/0106801 | A1 | 4/2017 | Morlet | |
| 2022/0105891 | A1* | 4/2022 | Nilsson | B60N 2/206 |

FOREIGN PATENT DOCUMENTS

| | | | |
|---|---|---|---|
| DE | 69814836 T2 | 9/2004 | |
| DE | 10338239 A1 | 3/2005 | |
| DE | 102012011430 A1 | 12/2012 | |
| FR | 2988658 A1 * | 10/2013 | ............... B60N 2/36 |
| FR | 2989649 A1 * | 10/2013 | ........... B60R 21/026 |
| FR | 3021272 A1 | 11/2015 | |
| FR | 3021273 A1 | 11/2015 | |
| FR | 3035627 A1 | 11/2016 | |
| JP | 2010018153 A | 1/2010 | |
| KR | 200339563 Y1 | 1/2004 | |
| WO | 2008050047 A2 | 5/2008 | |

OTHER PUBLICATIONS

Tang, Youming et al., "Bus Safety Technology," dated Oct. 31, 2015, 14 pages with translation.

* cited by examiner

CARGO DIVIDER FOR ARRANGEMENT BETWEEN A FIRST VEHICLE SEAT BACKREST AND AN ADJACENT SECOND VEHICLE SEAT BACKREST AND A VEHICLE SEAT

RELATED APPLICATION DATA

This application is a continuation of International Patent Application No. PCT/CN2020/132044, filed Nov. 27, 2020, which claims the benefit of European Patent Application No. 19218249.1, filed Dec. 19, 2019, the disclosures of which are incorporated herein by reference in their entireties.

TECHNICAL FIELD

The present disclosure relates to a cargo divider for arrangement between a first vehicle seat backrest and an adjacent second vehicle seat backrest for use when one of the first vehicle seat backrest and the second vehicle seat backrest is folded down and a vehicle seat. More specifically, the disclosure relates to a cargo divider for arrangement between a first vehicle seat backrest and an adjacent second vehicle seat backrest for use when one of the first vehicle seat backrest and the second vehicle seat backrest is folded down and a vehicle seat as defined in the introductory parts of the independent claims.

BACKGROUND

In vehicles that to some parts are open between the luggage compartment and the passenger or driver compartment it is common to have a cargo divider that can be extracted to cover the mentioned opening between the backrests and the luggage compartment. The cargo divider is extracted when transporting cargo goods in the luggage compartment that could become dangerous if the cargo shifts in a sudden braking operation or in case of an accident.

Backrests of the back seats of vehicles are often foldable so that the luggage space of the vehicle can be expanded. Extractable cargo dividers are then sometimes placed in cassettes at the top of the backrests so that a cargo divider can be extracted from the bottom of the luggage compartment to the ceiling of the vehicle when the backrests are folded down. The luggage space is thereby divided of from the front seats of the vehicle.

However, the cassettes described above only provides division and thereby protection in the forward direction of the vehicle. The occupants of the front seat are thereby protected by the cargo divider. But when not all backrests of the back seat are folded down, the seats that are not folded down will be open towards the expanded luggage compartment in the lateral direction. A passenger sitting in the backseat next to a backrest that is folded down may thus be susceptible to danger from transported cargo in case of an accident or at sharp turns of the vehicle.

There is thus a need for improved luggage safety in vehicles where backrests of the back seat can be folded down to expand the luggage compartment.

SUMMARY

It is an object of the present disclosure to mitigate, alleviate or eliminate one or more of the above-identified deficiencies and disadvantages in the prior art and solve at least the above mentioned problem. According to a first aspect there is provided a cargo divider for arrangement between a first vehicle seat backrest and an adjacent second vehicle seat backrest for use when one of the first vehicle seat backrest and the second vehicle seat backrest is folded down, the cargo divider comprising: a first structure part adapted to be arranged along a lateral edge of the first vehicle seat backrest adjacent the second vehicle seat backrest, comprising a first top section, a first middle section and a first bottom section; a second structure part adapted to be arranged along a lateral edge of the second vehicle seat backrest adjacent the first vehicle seat backrest, comprising a second top section, a second middle section and a second bottom section; a first wire comprising a first end attached to the first top section of the first structure part and a second end attached to the second top section of the second structure; one or a plurality of further wires comprising a first end attached along the first middle section of the first structure part and a second end attached correspondingly along the second middle section of the second structure part; wherein the first ends of each of the first wire and the one or a plurality of further wires are attached to the first structure part via a separate first biased roller so that each of the first wire and the one or a plurality of further wires are stretched at all times regardless of a relative folding angle between the first structure part and the second structure part.

A cargo divider is thereby achieved that protect passengers from cargo when only some backrests of a back seat are folded down. Also the cargo is protected from shifting during transport when the vehicle is moving. The biased retractable wires ensure that the wires of the cargo divider are stretched at all times regardless of which of the first backrest and the second backrest is folded down.

According to some embodiments the separate first biased roller includes a break hindering rotation of the roller that is faster than a predetermined threshold. It could be a centrifugal break as often used in seatbelts, a break actuated by acceleration or any other suitable break. An advantage of having such a brake is that the wires will not be further rolled out at sudden and fast movements. At low rotational speeds below the predetermined threshold, the wire can be pulled out, e.g. when folding down a backrest.

According to some embodiments, the second ends of each of the first wire and the one or a plurality of further wires are attached to the second structure part via a separate second biased roller. Having a roller in each end of the wires ensure smooth action of wires when they roll in and out.

According to some embodiments, the first biased roller and/or the second biased roller are biased via a spring in the respective roller. A spring loaded roller is a simple and robust solution for achieving the biasing of the rollers.

According to some embodiments, the cargo comprises a fabric attached to and stretched out by the first wire and the one or a plurality of further wires. A fabric will provide a cargo divider able to fixate also very small transported goods items that are transported. Having a fabric requires open rollers for the wires allowing the attached fabric to roll onto the rollers. It is further advantageous that rollers are placed at both ends of the wires as the fabric needs to be rolled in more at rollers placed at the top sections of the backrests than on rollers further down on the backrests.

According to some embodiments, the cargo comprises interconnecting cross wires or threads attached at crossing points to the first wire and the one or a plurality of further wires to form a net. A net will provide a cargo divider able to fixate smaller goods items that are transported. Having a net require open rollers for the wires allows the interconnecting cross wires or threads to roll onto the pars of the rollers. It is further advantageous that rollers are placed at both ends of the wires as the net needs to be rolled in more at rollers placed at the top sections of the backrests than on rollers further down on the backrests.

According to some embodiments, the wires are detachable at the second end. There may be situations where the cargo divider is not wanted even though a backrest of back seat is folded down. It is then advantageous to be able to detach the wires at one end and thereby disable the cargo divider.

According to some embodiments, each wire of the first wire and the one or a plurality of further wires are replaced by bands. Bands are strong at a low cost. Also, seat belt bands could be used as they are strong and commonly available for other purposes.

According to some embodiments, the first biased rollers are detachable. According to some embodiments, the first biased rollers and the second biased rollers are detachable. There may be situations where the cargo divider is not wanted even though a backrest of back seat is folded down. It is then advantageous to be able to detach the rollers at one end and thereby disable the cargo divider.

According to some embodiments, the first structure part and the second structure part are detachably arranged to the first vehicle seat backrest and the adjacent second vehicle seat backrest. In that way the entire cargo divider can be easily removed, which might be desired in some situations.

According to a second aspect there is provided a vehicle seat comprising a foldable first vehicle seat backrest and an adjacent foldable second vehicle seat backrest, comprising the cargo divider according to the first aspect. The foldable first vehicle seat backrest and the foldable second vehicle seat backrest may be adjacent to each other with or without a distance between them.

According to some embodiments, the vehicle comprises one or a plurality of further vehicle seat backrest the vehicle comprises the cargo divider according to the first aspect between any adjacent vehicle seat backrests. In the case of e.g. three foldable vehicle seat backrests any of the vehicle seat backrests, also the middle vehicle seat backrest, may be folded down while still fixating cargo and/or protecting passengers.

According to some embodiments, the first vehicle seat backrest, the second vehicle seat backrest and any further vehicle seat backrest are placed adjacent each other but with a separating distance when the first vehicle seat backrest, the second vehicle seat backrest and any further vehicle seat backrest are in an upright position, and wherein the cargo divider extend over the separating distance. The disclosed cargo divider will function equally well if there is a distance between the vehicle seat backrests.

According to some embodiments, the first vehicle seat backrest, the second vehicle seat backrest and any further vehicle seat backrest are placed adjacent each other and in abutment with each other when the first vehicle seat backrest, the second vehicle seat backrest and any further vehicle seat backrest are in an upright position.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
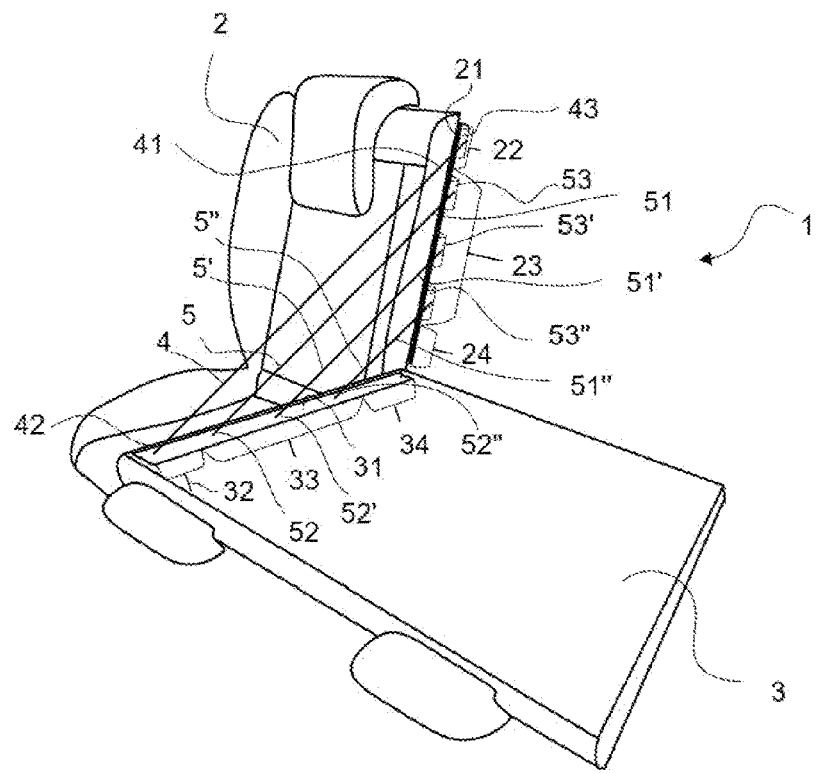
FIG. 1 shows a perspective view of the cargo divider according to an embodiment of the present disclosure.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

FIGS. 1-4 show different embodiments of the cargo divider 1 for arrangement between a first vehicle seat backrest 2 and an adjacent second vehicle seat backrest 3 according to the first aspect of the disclosure and the vehicle seat according to the second aspect of the invention. The figures disclose a foldable first vehicle seat backrest 2 and an adjacent foldable second vehicle seat backrest 3 with the cargo divider according to the first aspect in between the seats backrest 2, 3. In the Figures the right vehicle seat backrest 2 is in an upright position and the left and middle vehicle seat backrests 3 of the backseat are folded down to create an extra cargo volume on top of the folded down vehicle seat backrests 3. Wires 4, 5, 5', 5" of the cargo divider are stretched in the opening between the folded down vehicle seat backrest and the upright vehicle seat backrest 2. Cargo items can thus be stored in the extra cargo volume on top of the folded down vehicle seat backrests 3 without risking to shift into the passenger seat 2 where a passenger may be seated.

FIG. 1 shows the first aspect of this disclosure with a cargo divider 1 for arrangement between a first vehicle seat backrest 2 and an adjacent second vehicle seat backrest 3 for use when one of the first vehicle seat backrest 2 and the second vehicle seat backrest 3 is folded down. The cargo divider 1 comprises a first structure part 21 adapted to be arranged along a lateral edge of the first vehicle seat backrest 2 adjacent the second vehicle seat backrest 3, comprising a first top section 22, a first middle section 23 and a first bottom section 24. The cargo divider further comprises a second structure part 31 adapted to be arranged along a lateral edge of the second vehicle seat backrest 3 adjacent the first vehicle seat backrest 2, comprising a second top section 32, a second middle section 33 and a second bottom section 34. The cargo divider further comprises a first wire 4 comprising a first end 41 attached to the first top section 22 of the first structure part 21 and a second end 42 attached to the second top section 32 of the second structure 31. The cargo divider further comprises one or a plurality of further wires 5, 5', 5" comprising a first end 51, 51', 51" attached along the first middle section 23 of the first structure part 21 and a second end 52, 52', 52" attached correspondingly along the second middle section 33 of the second structure part 31. The first ends 41, 51, 51', 51" of each of the first wire 4 and the one or a plurality of further wires 5, 5', 5" are attached to the first structure part 21 via a separate first biased roller 43, 53, 53', 53" so that each of the first wire 4 and the one or a plurality of further wires 5, 5', 5" are stretched at all times regardless of a relative folding angle 9 between the first structure part 21 and the second structure part 31.

The cargo divider 1 thereby protects passengers from cargo when a part of a back seat is folded down, e.g. the second vehicle seat backrest 3 (the two left seats of the back seat) as shown in FIG. 1. Cargo placed in the cargo space created on top of the folded left second vehicle seat backrest 3 is protected during transport from shifting onto the right seat where a passenger may be seated. The biased retractable wires ensure that the wires of the cargo divider are stretched at all times regardless of which of the first back rest and the second backrest is folded down.

The separate first biased roller 43, 53, 53', 53" include an internal break (not shown) hindering rotation of the roller that is faster than a predetermined threshold. It could be a centrifugal break as often used in seatbelts, a break actuated by acceleration or any other suitable break. The brake will stop the wires from being further rolled out at sudden and fast movements. At low rotational speeds below the predetermined threshold, the wire can be pulled out, as e.g. when the left second vehicle seat backrest 3 in FIG. 1 is folded down.

Figure 2:
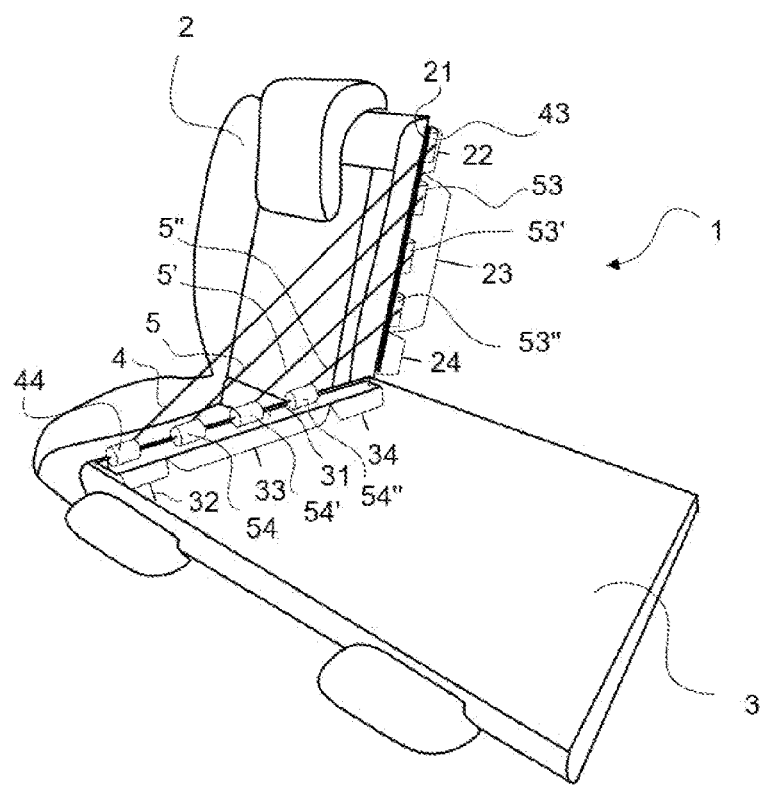
FIG. 2 shows a perspective view of the cargo divider according to an embodiment of the present disclosure with biased rollers at both ends of the wires.

FIG. 2 illustrates a further embodiment of the present disclosure wherein the second ends 42, 52, 52', 52" of each of the first wire 4 and the one or a plurality of further wires 5, 5', 5" are attached to the second structure part 31 via a separate second biased roller 44, 54, 54', 54".

The first biased roller 43, 53, 53', 53" and/or the second biased roller 44, 54, 54', 54" of FIGS. 1 and 2 are biased via a spring (not shown) in the respective roller so that the wires are rolled up when the cargo divider is not used or so that the wires are stretched if the a seat is only partly folded down.

Figure 3:
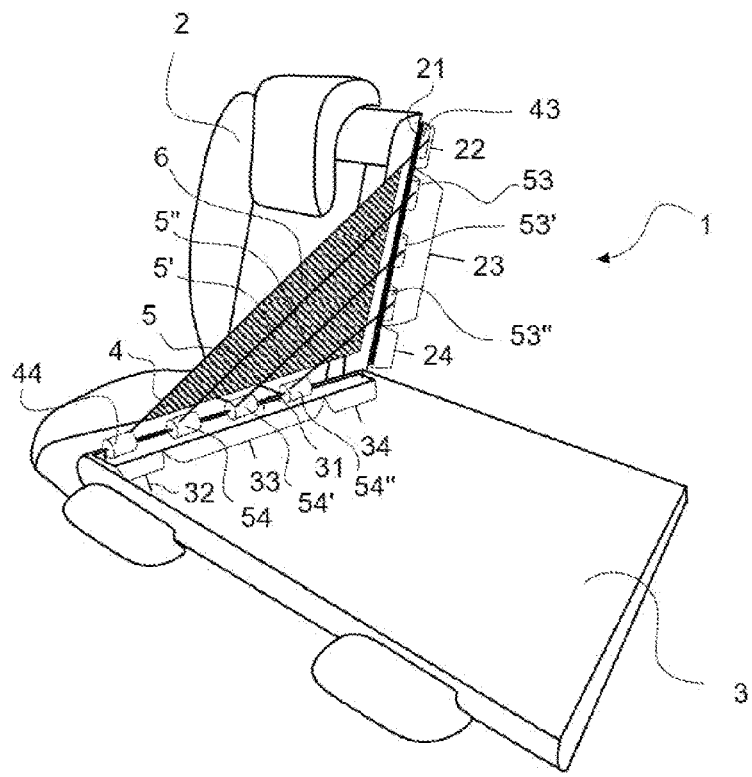
FIG. 3 shows a perspective view of the cargo divider according to an embodiment of the present disclosure with a fabric attached to the wires.

FIG. 3 shows a further embodiment of the present disclosure where the cargo divider comprises a fabric 6 attached to and stretched out by the first wire 4 and the one or a plurality of further wires 5, 5', 5". The fabric 6 provides fixation also to very small transported goods items that are transported. The fabric 6 is rolled onto open rollers when the cargo divider is not used. Rollers are placed at both ends of the wires as the fabric needs to be rolled in more at rollers 43, 44 placed at the top sections 22, 32 of the backrests than on rollers 53, 53', 53"; 54, 54', 54" further down on the backrests 2, 3.

Figure 4:
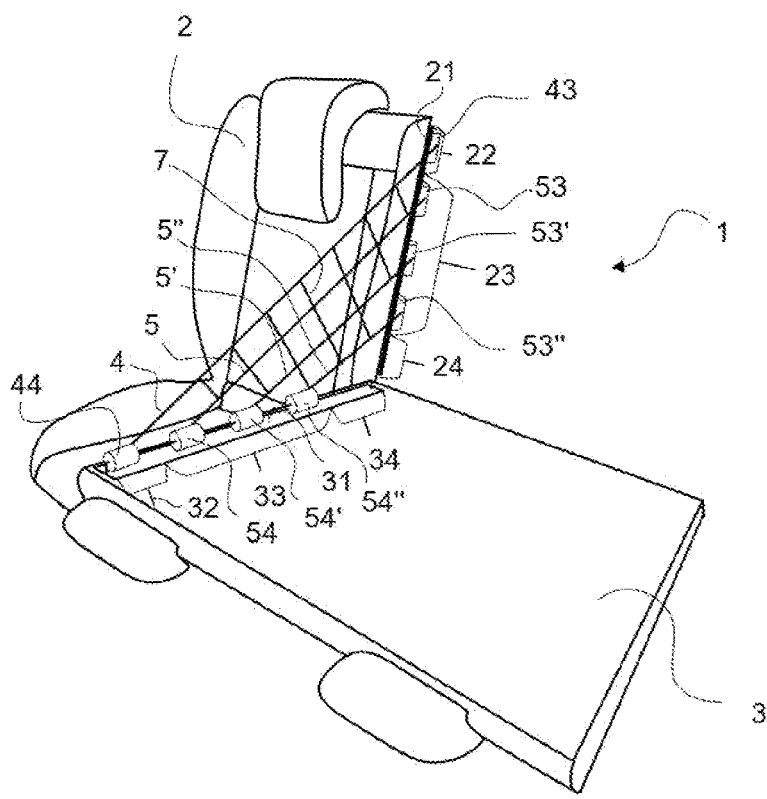
FIG. 4 shows a perspective view of the cargo divider according to an embodiment of the present disclosure with interconnecting threads between the wires.

FIG. 4 shows a further embodiment of the present disclosure where the cargo divider comprises interconnecting cross wires or threads 7 attached at crossing points to the first wire 4 and the one or a plurality of further wires 5, 5', 5" to form a net as an alternative to the fabric 6 shown in FIG. 3. The net achieved by the interconnecting cross wires or threads 7 is transparent and allows the occupants of the vehicle to see the transported items through the cargo divider 1.

The wires of FIGS. 1-4 are optionally detachable at the second end 42, 52, 52', 52" to facilitate the option of not using the cargo divider if preferred. In FIGS. 2-4 the first biased rollers 43, 53, 53', 53" are optionally detachable instead to achieve the same result. A third option is that the first biased rollers 43, 53, 53', 53" and the second biased rollers 44, 54, 54', 54" are detachable. A fourth option is that the entire first structure part 21 and the second structure part 31 are detachably arranged to the first vehicle seat backrest 2 and the adjacent second vehicle seat backrest 3 so that the cargo divider can be completely removed.

In a further embodiment of the disclosure each wire of the first wire 4 and the one or a plurality of further wires 5, 5', 5" are replaced by bands (not shown). The bands may be of seat belt type, e.g. or any other strong band.

In one embodiment of the present disclosure the first vehicle seat backrest 2, the second vehicle seat backrest 3 and any further vehicle seat backrest are placed adjacent each other but with a separating distance (not shown) when the first vehicle seat backrest 2, the second vehicle seat backrest 3 and any further vehicle seat backrest are in an upright position, and wherein the cargo divider extend over the separating distance to stop cargo in the lateral direction. The cargo divider may thus be used between any adjacent seats regardless whether there is a distance between the seats or not.

The person skilled in the art realizes that the present disclosure is not limited to the preferred embodiments described above. The person skilled in the art further realizes that modifications and variations are possible within the scope of the appended claims. For example, the vehicle may comprise a plurality of further vehicle seat backrest with cargo dividers according to the first aspect between any adjacent vehicle seat backrests.

Additionally, variations to the disclosed embodiments can be understood and effected by the skilled person in practicing the claimed disclosure, from a study of the drawings, the disclosure, and the appended claims.

What is claimed is:

1. A cargo divider for arrangement between a first vehicle seat backrest and an adjacent second vehicle seat backrest for use when one of the first vehicle seat backrest and the second vehicle seat backrest is folded down, the cargo divider comprising:
   a first structure part adapted to be arranged along a lateral edge of the first vehicle seat backrest adjacent the second vehicle seat backrest, comprising a first top section, a first middle section and a first bottom section;
   a second structure part adapted to be arranged along a lateral edge of the second vehicle seat backrest adjacent the first vehicle seat backrest, comprising a second top section, a second middle section and a second bottom section;

a first wire comprising a first end attached to the first top section of the first structure part and a second end attached to the second top section of the second structure;

one or a plurality of further wires comprising a first end attached along the first middle section of the first structure part and a second end attached correspondingly along the second middle section of the second structure part;

wherein the first ends of each of the first wire and the one or a plurality of further wires are attached to the first structure part via a separate first biased roller so that each of the first wire and the one or a plurality of further wires are stretched at all times regardless of a relative folding angle between the first structure part and the second structure part.

2. The cargo divider according to claim 1, wherein each of the separate first biased rollers include a brake hindering rotation of the roller that is faster than a predetermined threshold.

3. The cargo divider according to claim 1, wherein the second ends of each of the first wire and the one or a plurality of further wires are attached to the second structure part via a separate second biased roller.

4. The cargo divider according to claim 3, wherein each of the first biased rollers and/or each of the second biased rollers are biased via a spring in the respective roller.

5. The cargo divider according to claim 3, wherein the first biased rollers and the second biased rollers are detachable.

6. The cargo divider according to claim 1, further comprising a fabric attached to and stretched out by the first wire and the one or a plurality of further wires.

7. The cargo divider according to claim 1, further comprising interconnecting cross wires or threads attached at crossing points to the first wire and the one or a plurality of further wires to form a net.

8. The cargo divider according to claim 1, wherein the first wire and the one or a plurality of further wires are detachable at the second end.

9. The cargo divider according to claim 8, wherein the first biased roller and the one or a plurality of further wires are detachable.

10. The cargo divider according to claim 1, wherein each wire of the first wire and the one or a plurality of further wires are flat.

11. The cargo divider according to claim 1, wherein the first structure part and the second structure part are detachably arranged to the first vehicle seat backrest and the adjacent second vehicle seat backrest.

12. A vehicle seat comprising a foldable first vehicle seat backrest and an adjacent foldable second vehicle seat backrest, comprising the cargo divider according to claim 1.

13. The vehicle seat according to claim 12, wherein the first vehicle seat backrest, the second vehicle seat backrest and any further vehicle seat backrest are placed adjacent each other but with a separating distance when the first vehicle seat backrest, the second vehicle seat backrest and any further vehicle seat backrest are in an upright position, and wherein the cargo divider extend over the separating distance.

14. The vehicle seat according to claim 12, wherein the first vehicle seat backrest, the second vehicle seat backrest and any further vehicle seat backrest are placed adjacent each other and in abutment with each other when the first vehicle seat backrest, the second vehicle seat backrest and any further vehicle seat backrest are in an upright position.

* * * * *